US010486727B2

(12) United States Patent
Dettner et al.

(10) Patent No.: US 10,486,727 B2
(45) Date of Patent: Nov. 26, 2019

(54) WHEELBARROW

(71) Applicant: 9875549 CANADA INC., Barrie (CA)

(72) Inventors: Terry Dettner, Utopia (CA); Steve Johnson, Markham (CA)

(73) Assignee: 9875549 CANADA INC., Barrie (CA)

( * ) Notice: Subject to any disclaimer, the term of this patent is extended or adjusted under 35 U.S.C. 154(b) by 116 days.

(21) Appl. No.: 15/712,591

(22) Filed: Sep. 22, 2017

(65) Prior Publication Data
US 2018/0079439 A1 Mar. 22, 2018

Related U.S. Application Data
(60) Provisional application No. 62/397,043, filed on Sep. 20, 2016.

(51) Int. Cl.
*B62B 5/00* (2006.01)
*B62B 1/24* (2006.01)

(52) U.S. Cl.
CPC .............. *B62B 5/0046* (2013.01); *B62B 1/24* (2013.01); *B62B 5/0053* (2013.01)

(58) Field of Classification Search
CPC .................................................................
B62B 5/0046; B62B 1/24; B62B 1/18; B62B 5/0026; B62B 5/0033; B62B 5/0036
See application file for complete search history.

(56) References Cited

U.S. PATENT DOCUMENTS

| | | | | |
|---|---|---|---|---|
| 3,608,659 A * | 9/1971 | Gardner | ................ | B62B 5/0026 180/19.3 |
| 3,719,247 A * | 3/1973 | Hollis | ..................... | B62B 1/042 180/19.3 |
| 3,856,104 A * | 12/1974 | Ohba | ....................... | B62D 1/28 180/167 |
| 4,096,919 A * | 6/1978 | Thompson | ............... | B60K 7/00 123/185.2 |
| 4,811,988 A * | 3/1989 | Immel | ....................... | B62B 3/08 180/19.1 |
| 4,848,497 A * | 7/1989 | Laguilharre | ............. | B60K 1/00 180/65.6 |
| 5,350,030 A * | 9/1994 | Mawhinney | ............... | B62B 1/24 180/19.3 |
| 6,502,656 B2 * | 1/2003 | Weiss | ....................... | A45C 5/14 180/168 |
| 6,976,287 B2 * | 12/2005 | Muth | ...................... | B62B 3/001 15/320 |
| 7,762,050 B1 * | 7/2010 | Kaskawitz | ......... | A01D 34/6806 180/19.3 |

(Continued)

*Primary Examiner* — Kevin Hurley
(74) *Attorney, Agent, or Firm* — Anil Bhole; Marc Lampert; Bhole IP Law

(57) ABSTRACT

A wheelbarrow having a load carrying body supported on a chassis. An electrically powered axle assembly is located at one end of the chassis and has a pair of wheels disposed at opposite sides of the axle assembly. The chassis includes a pair of side plates that extend downwardly to provide legs and a cross member extending between the side plates to maintain them in spaced relationship. A shelf extends between the side plates and is spaced below the underside of the body to provide a cavity to receive a battery. A pair of handles is secured to the side plates, one on each side of the body to transfer loads from the handles in to the chassis and the body is secured to the handles and side plates at a common connection.

20 Claims, 8 Drawing Sheets

(56) References Cited

U.S. PATENT DOCUMENTS

| | | | |
|---|---|---|---|
| 7,793,744 B1* | 9/2010 | Hardie | B62B 1/12 |
| | | | 180/19.1 |
| 8,465,103 B2* | 6/2013 | Burt | B62D 51/007 |
| | | | 180/9.22 |
| 9,120,499 B2* | 9/2015 | Michel, Jr. | B62B 1/18 |
| 9,694,859 B2* | 7/2017 | Martel | A63C 11/10 |
| 9,796,401 B1* | 10/2017 | Ammirati | B62B 5/005 |
| 2006/0006726 A1* | 1/2006 | Garvey | B62B 1/24 |
| | | | 298/2 |
| 2007/0269300 A1* | 11/2007 | Menard | B62B 3/001 |
| | | | 414/444 |

\* cited by examiner

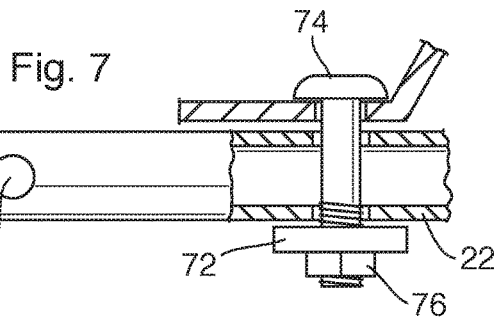
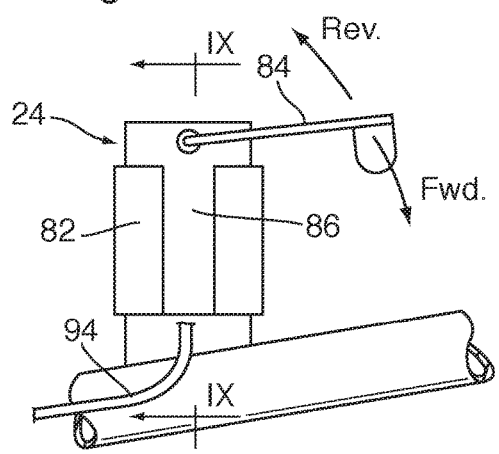
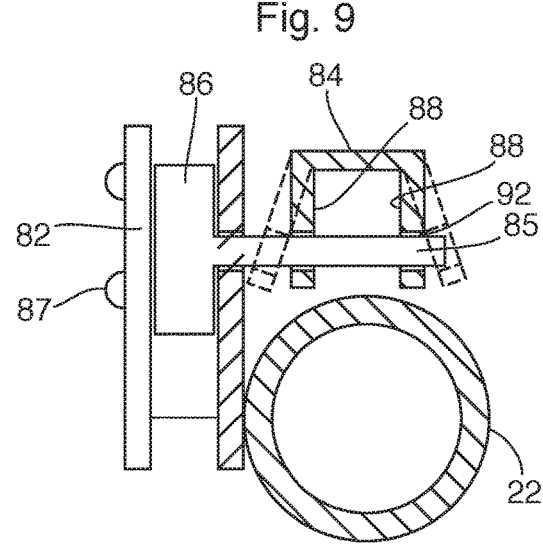
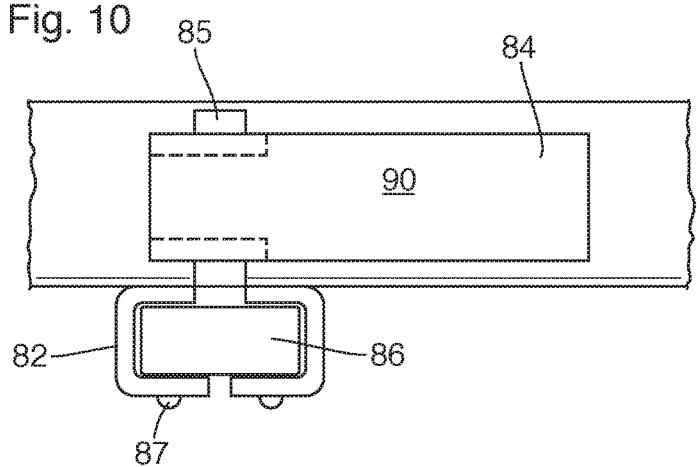

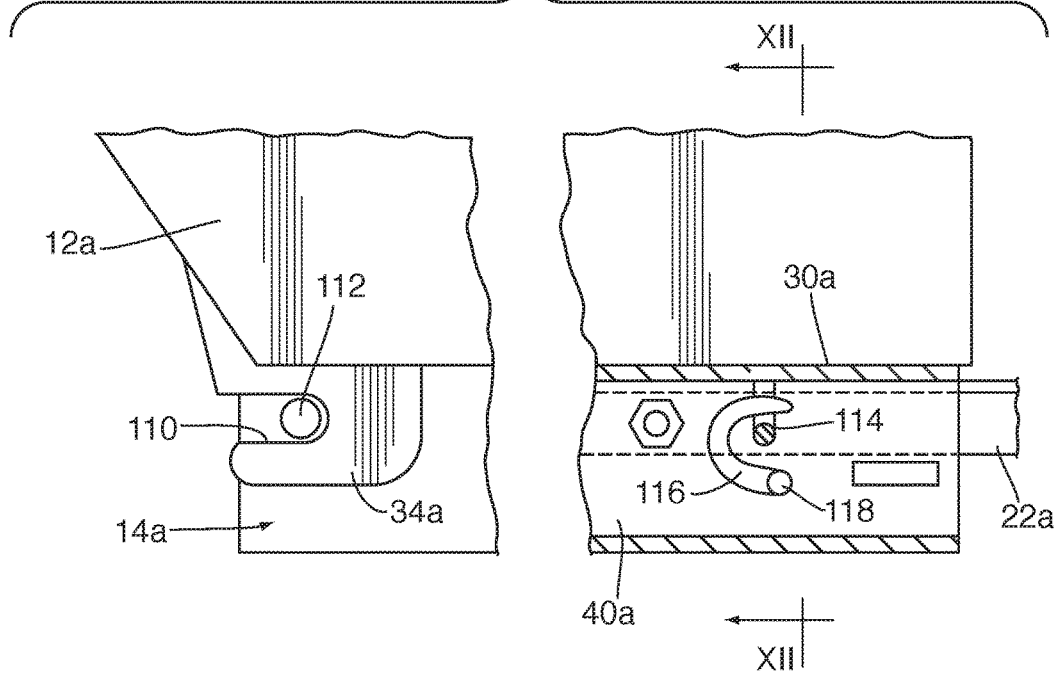
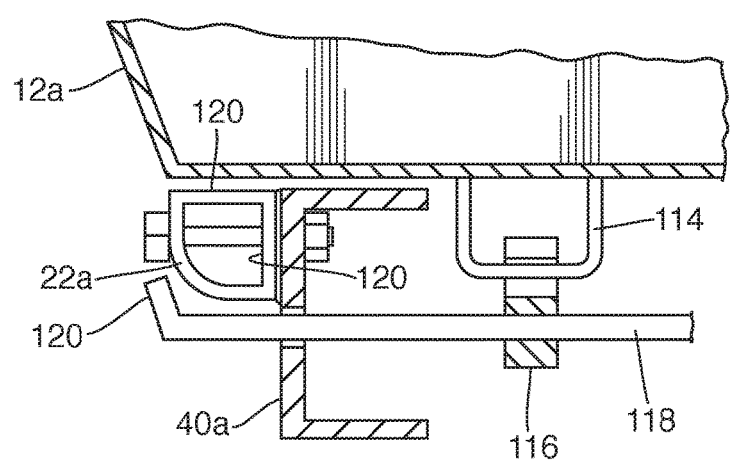

WHEELBARROW

RELATED APPLICATIONS

This application claims priority from U.S. provisional application 62/397,043, the contents of which are incorporated herein by reference.

FIELD OF THE INVENTION

The present invention relates to wheelbarrows

DESCRIPTION OF THE PRIOR ART

Wheelbarrows are the ubiquitous material moving device, having been used for centuries and still widely used today. They consist of a load carrying body which is supported at one end on a wheeled axle. The body is also supported on a pair of legs to provide a stable support for the body. A pair of handles project from the opposite end of the body so the body and legs can be lifted and the barrow moved along the ground on the wheel. The body typically has upstanding sides to assist in containing the material, although it may simply be a platform or other custom support in particular applications.

The prime motive power is of course manual with the operator lifting the load supported on the body and providing the force to move it along the ground. Moving large volumes of material may be arduous, but the simplicity of the wheelbarrow and its versatility means that it remains in widespread use. In some instances, such as where there is restricted access or limited manoeuvrability, the wheelbarrow is the only practical way to move material to or from a work site.

The arduous nature of the work limits productivity, particularly where relatively heavy materials such as concrete have to be moved over undulating terrain. Attempts have been made in the past to motorise the wheelbarrow and provide the motive force. However, such efforts have failed to maintain the simplicity, ruggedness and versatility of the basic tool.

It is therefore an object of the present invention to obviate or mitigate the above disadvantages.

SUMMARY OF THE INVENTION

In general terms, the present invention provides a wheelbarrow having a load carrying body supported on a chassis. An electrically powered axle assembly is located at one end of the chassis and has a pair of wheels disposed at opposite sides of the axle assembly. The chassis includes a pair of side plates that extend downwardly to provide legs and a cross member extending between the side plates to maintain them in spaced relationship. A shelf extends between the side plates and is spaced below the underside of the body to provide a cavity to receive a battery. A pair of handles is secured to the side plates, one on each side of the body to transfer loads from the handles in to the chassis and the body is secured to the handles and side plates at a common connection.

Preferably the body is pivoted to the chassis at its forward end to permit access to the cavity.

Preferably also a directional switch is carried on one of the handles so as to be accessible to the operator while lifting the load. In one embodiment, the switch can be moved to either side of a null position for movement in opposite directions.

As a further preference, control circuitry for the axle is mounted on a side plate above the shelf.

BRIEF DESCRIPTION OF THE DRAWINGS

Embodiments of the present invention will now be described by way of example only with reference to the appended drawings wherein:

FIG. 7 is a view on an enlarged scale of a portion of the wheelbarrow of FIG. 1, FIG. 8 is a detailed view of a control of the wheelbarrow of FIG. 1;

FIG. 9 is a section on the line IX-IX of FIG. 8

FIG. 10 is a plan view of the control of FIG. 8;

FIG. 11 is a side view, partly in section, of an alternative embodiment of wheelbarrow;

FIG. 12 is a section on the line XII-XII of FIG. 11; and

DETAILED DESCRIPTION OF THE INVENTION

Figure 1:
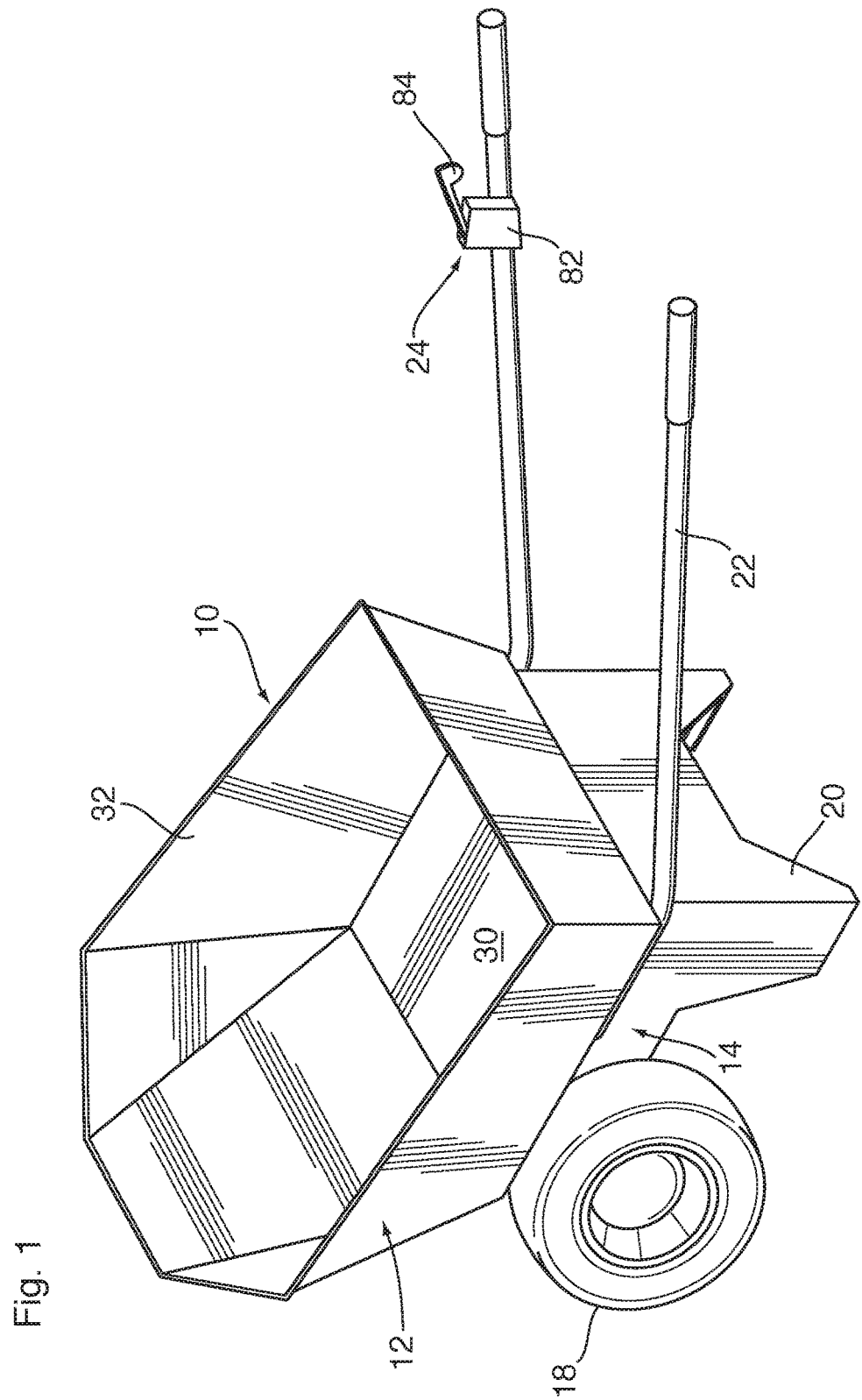
FIG. 1 is a perspective view of a wheelbarrow.
Figure 2:
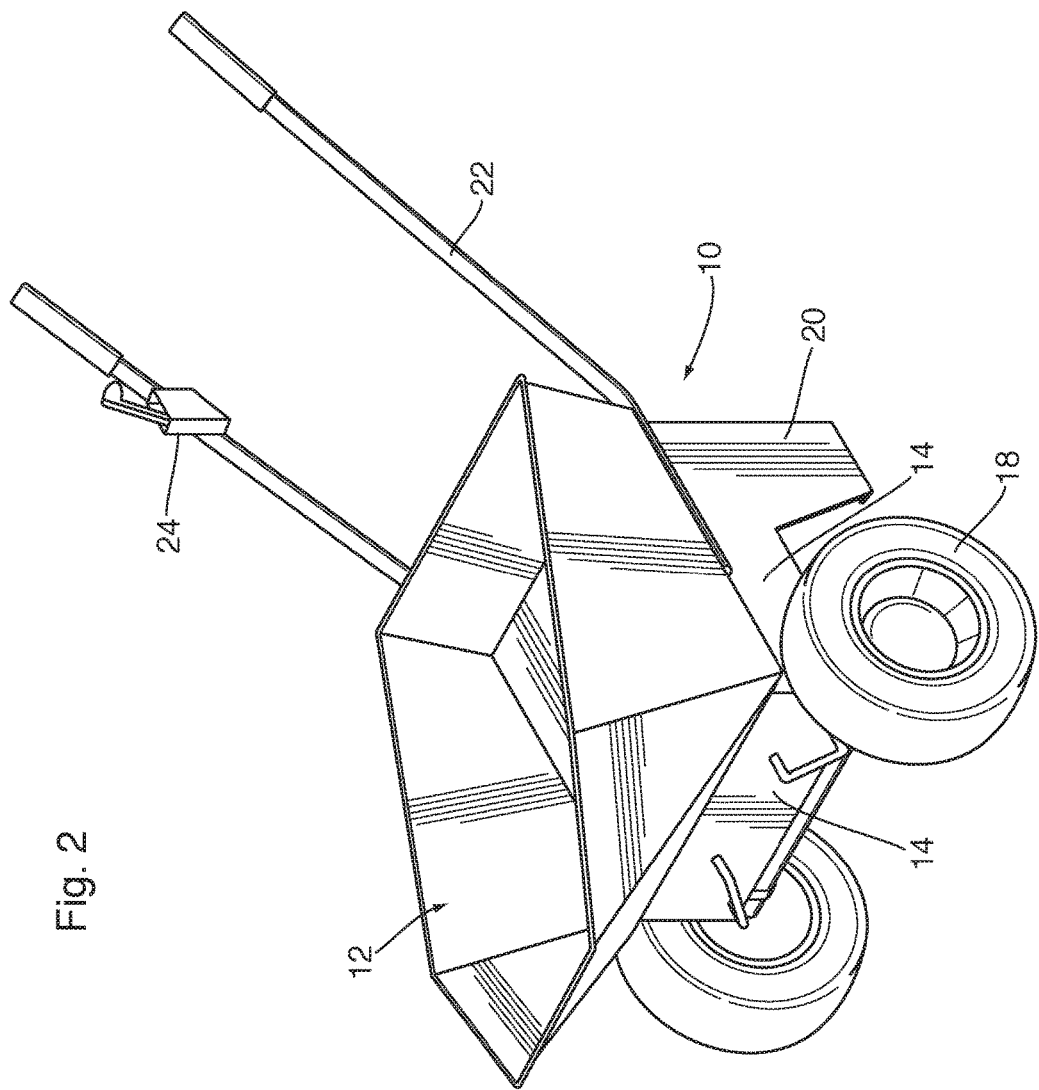
FIG. 2 is a front perspective view of the wheelbarrow of FIG. 1.
Figure 3:
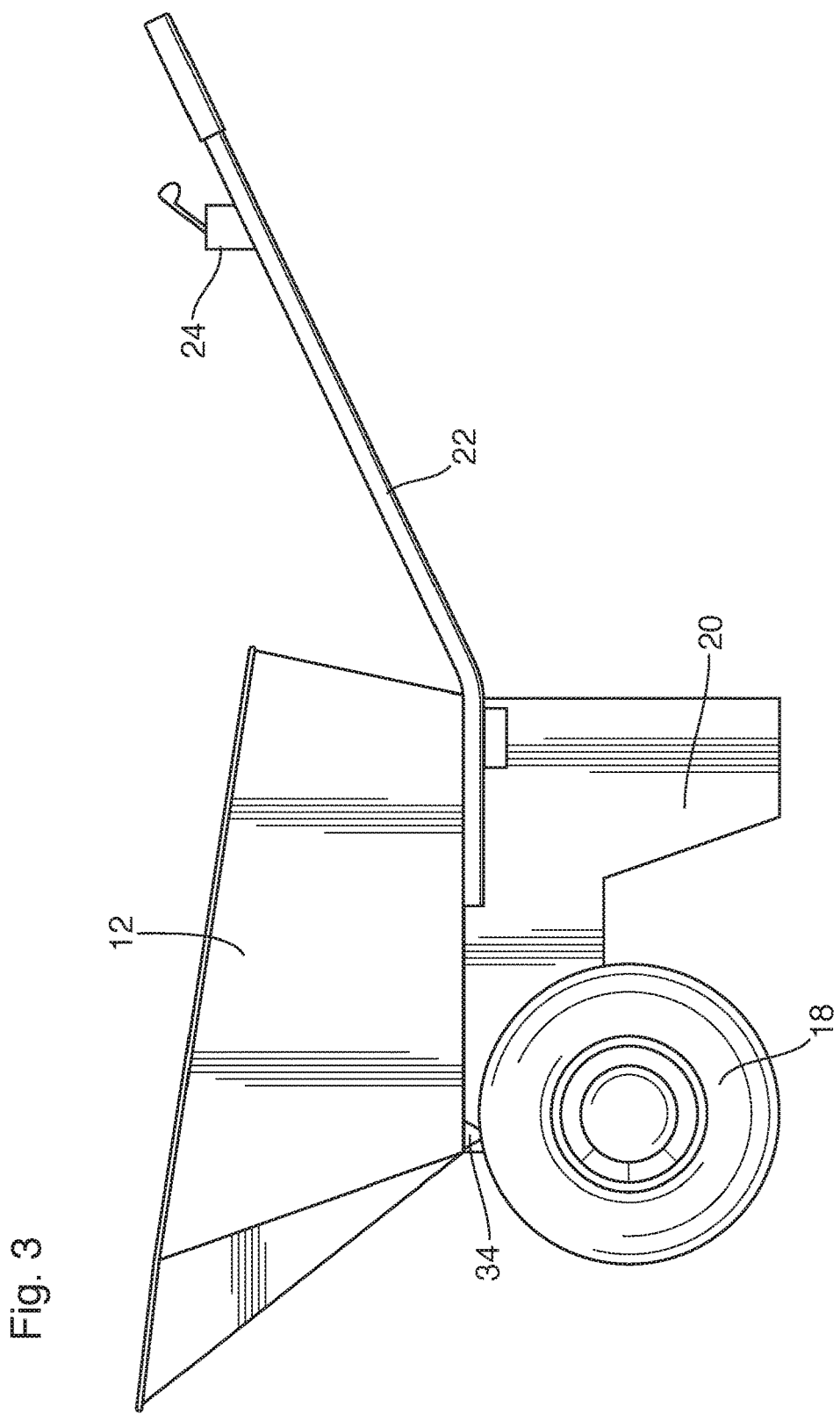
FIG. 3 is a side view of the wheelbarrow of FIG. 1.

Referring firstly to FIGS. 1 to 3, a wheelbarrow 10 includes a body 12 that is mounted on a chassis 14. An axle assembly 16 is located on the chassis at the forward end of the wheelbarrow 10 and has a pair of wheels 18 located on either side of the chassis 14. The chassis is formed with a pair of legs 20 that are dimensioned to maintain the body in a stable orientation when in contact with the ground. A pair of handles 22 extends rearwardly from the chassis 14 and a directional control 24 is mounted on one of the handles 22 adjacent its distal end.

The body 12 is formed from a sheet material, such as metal, and has a base 30 and upwardly directed sides 32 that flare outwardly. The forward portion 33 of the body 12 is configured to provide a broad spout to facilitate pouring of a liquid from the body 12. It will be appreciated that the configuration of the body 12 may conform to any preferred configuration, including a simple platform if desired, and may be made of a size or shape suitable for the intended purpose and of a suitable material including a molded plastic shell.

Figure 4:
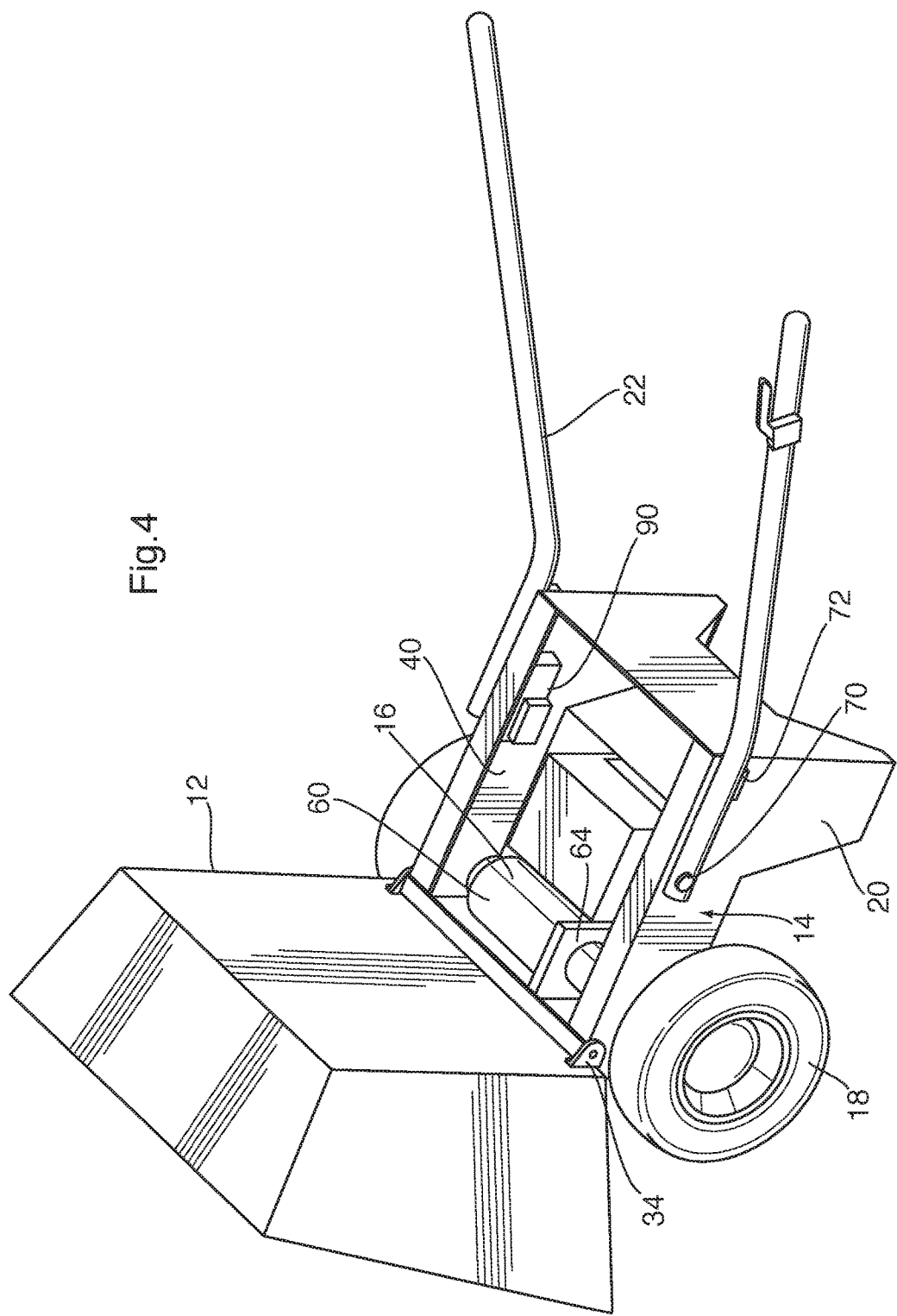
FIG. 4 is a rear perspective view of the wheelbarrow of FIG. 1 configured to provide access to a drive mechanism.

As best seen in FIG. 4, the body 12 is pivotally connected to the chassis 14 by a pair of lugs 34 that are welded to the body 12. The lugs are connected to the chassis 14 by bolts 36 that define a transverse pivot axis for the bolt 12.

Figure 6:
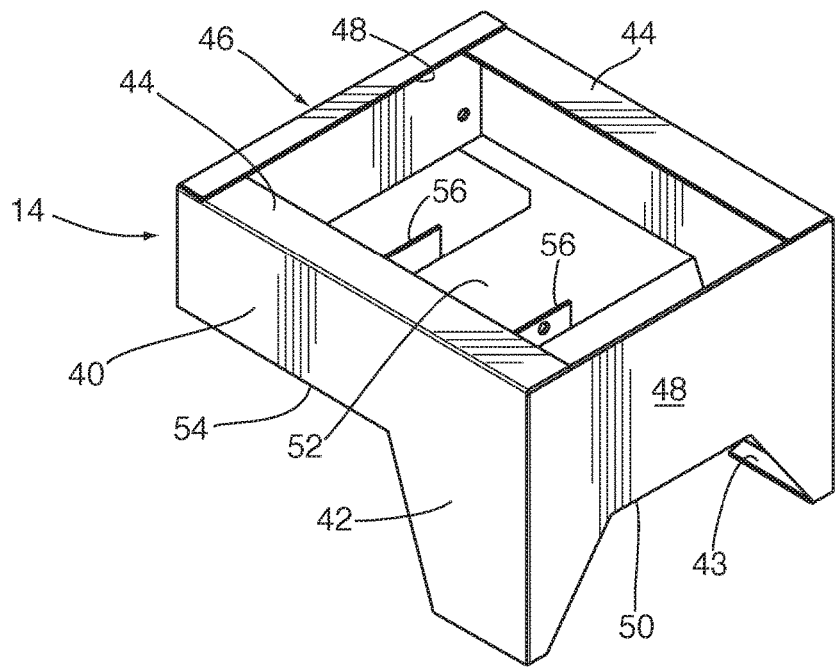
FIG. 6 is a top perspective view of the chassis of the wheelbarrow of FIG. 1.

The construction of the chassis 14 can also be seen in FIGS. 4 and 6 and has a pair of side plates 40. Each of the side plates 40 has a downwardly projecting triangular portion, indicated at 42, that defines the legs 20. The lower ends 43 of the portions 42 are turned inward to provide a flat horizontal surface at the end of the leg 20.

Upper edges of the side plates 40 have inwardly directed flanges 44 that provide a planar generally horizontal support for the base 30 of the body 12 and enhance the rigidity of the side plates 40. The side plates 40 are interconnected at their forward and rear by transverse cross members 46, 48 respectively.

The forward cross member 46 is of similar height to the side plates 40 and has an inturned flange 48 on its upper edge that overlaps the flanges 44. The rear cross member 48 is planar and has a trapezoidal notch 50 on its lower edge. The extremities of the rear cross member 50 are of the same height as the triangular portion 42 and co-operate with the portions 42 to provide lateral stability for the legs 20.

A shelf 52 extends between the side plates 40 between the lower edges 54 of the side plates 40. The shelf 52 extends forwardly from the intersection of the triangular portion 42 with the lower edge 54 to the forward cross member 46. A central portion of the shelf 52 adjacent to the forward cross member 46 is removed to accommodate the axle assembly 16 and a pair of retaining flanges 56 are formed on the front and rear of the shelf 52.

It will be appreciated that the chassis 14 may be fabricated from individual panels that are welded and/or bolted together. In the embodiment shown, the side plates 40 and shelf 52 are formed as a single piece with the side plates 40 folded up from the shelf 52. The transverse cross members 46, 48 are then welded to the vertical edges of the side plates to provide a strong unitary construction to support the body 12.

Figure 5:
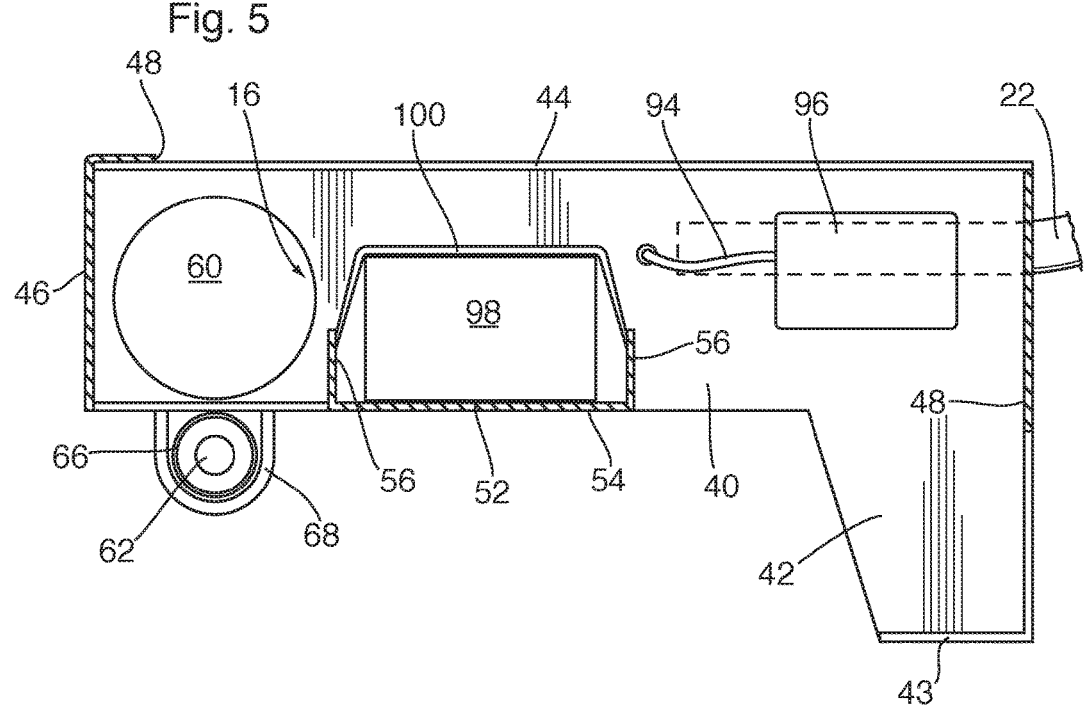
FIG. 5 is a section on the line V-V of FIG. 1.

The location of the axle assembly 16 can be seen in FIGS. 4 and 5. The axle assembly is a commercially available electric drive, such as that available from Zhejang Import and Export Company under reference number RP-T3-800B. It has a motor 60 that drives an axle 62 through a transmission 64. The axle is located in a housing 66 that rotatably supports the axle 62. The housing 66 is connected to the chassis 14 by a pair of saddle clamps 68 (FIG. 5) that are bolted to the forward projections of the shelf 52.

The handles 22 are also connected to the side plates 40 above the legs 20. Each of the handles 22 is formed from a tubular material which is cranked upwardly and outwardly so the handles diverge from one another toward the rear. The handles 22 are secured to the side plate 40 by a bolt 70 that passes through the handle and side plate 40. Each of the handles 22 is also secured by a lug 72, shown in greater detail in FIG. 7, that projects outwardly from the side plate 40. The handle 22 rests on the upper surface of the lug 72 so as to be positioned between the base 30 of the body 12 and the lug 72. A bolt 74 passes through the base 30, handle 22 and lug 72 and is secured by a nut 76. The vertical loads placed on the handle 22 are therefore taken by the lug 72 and transferred in to the chassis 14. The bolt 70 is spaced along the handle 22 and arranged perpendicular to the bolt 74 to provide improved resistance to the turning moment generated by the flared handles 22 when lifting a load in the body 12.

The distal end of one of the handles 22, typically the right hand handle, carries the directional control 24 that is mounted in a socket 82 welded to the handle 22. The control 24 is shown in FIGS. 8 to 10 and includes a paddle 84 that is mounted on a spindle 85 of a potentiometer 86. The spindle 85 is rotatable so that the potentiometer provides a varying control signal as the spindle is rotated. The potentiometer 86 is releasably secured in the socket 82, such as by screws 87, and oriented so the spindle 85 projects across the handle 22.

The paddle 84 has a pair of ears 88 that depends from an elongate body 90 that is oriented along the handle 22 and away from the body 12. Each of the ears 88 has an aperture 92 that is complimentary to the cross section of the spindle 85. Preferably, the spindle 85 has a D-shaped cross section with a flat to provide a secure torque transmitting connection between the paddle 84 and spindle 85. In the free body condition, as illustrated by dashed lines in FIG. 9, the ears 88 diverge from the body 90 and require the application of a force to bring them parallel and allow the spindle to pass through the apertures 92. Once located in the apertures, the force is removed and the resilience of the ears causes the apertures 92 to engage the spindle 85 and secure the paddle 84 on the spindle.

The potentiometer 86 functions as a directional switch that provides a varying output dependent on the position of the paddle 84 relative to the handle 22. The potentiometer 86 has a central null position and permits movement of the paddle 84 to either side of the null position to vary the output of the switch. The paddle 84 is located on the spindle 85 so that it may swing in an arc lying in the plane of the handle 22 and is positioned on the handle 22 so it may be manipulated in either direction by the thumb of the operator when grasping the handle 22.

The potentiometer 86 is connected by wires 94 to a control board 96 that is mounted on the inside of the side plate 40 and protected by the flanges 44. The wires 94 extend from the potentiometer 86 through the interior of the handle 22 and in to the interior of the chassis 14 through a hole in the side plate 40. The control board 96 is available from Curtis Instruments Inc. under reference number 1212-2401 and regulates the speed and direction of rotation of the axle 62 in response to variations in the control signal from the potentiometer 86 resulting from movement of the paddle 84. Electrical power for the motor is provided by a pair of batteries 98 that are mounted on the shelf 52 and secured in situ by straps 100 that engage the retaining flanges 56. Additional functions for the control board 96 are located on the rear cross member 48 and include an on-off switch and a charging port.

Access to the batteries is provided by the pivoting mounting of the body 12 on the chassis 14. Release of the bolts 74 from the lug 72 allows the body to pivot forward to the position shown in FIG. 4 and expose the batteries 98 and control circuits 96. In use, the body is retained on the chassis 14 and the batteries protected in the cavity formed between the base 30 of body 12 and the shelf 52 of the chassis 14. The axle assembly protects the batteries from incursions from the forward edge.

With the body secured, a load can be placed in the body and the distal ends of the handles 22 grasped in a conventional manner to lift the legs 20 clear of the ground. The paddle 84 is conveniently within reach of the thumb of the operator 22 and can be manipulated by the operator without having to release the handle to move the wheelbarrow 10 either forwards or rearwards. Moving the paddle 84 down toward the handle 22 activates the motor for forward movement and the further it is moved, the greater the speed. Similarly, pushing the paddle 94 away from the handle causes the wheelbarrow to move rearward. The directional and speed control is therefore intuitive and can be used without interrupting the normal operation of the wheelbarrow or releasing the grip from the wheelbarrow.

It will be seen therefore that the provision of the chassis provides a strong, relatively lightweight construction that properly supports the body 12 while retaining the functionality of a conventional wheelbarrow. The provision of the cavity between the shelf and base of the body properly protects the batteries and the pivotal mounting of the body on the chassis permits ready access to the batteries when required. The controller on the handle 22 also ensures control of the wheelbarrow when in use without jeopardising the ability to support the load in a stable manner.

A further embodiment of the wheelbarrow 10 is shown in FIGS. 11 and 12 and like reference numerals will be used to describe like components with a suffix "a" added for clarity. In the embodiment of FIGS. 11 and 12, access to the batteries is facilitated by the mounting arrangement of the body 12a on the chassis 14a. The lugs 34a are formed with a forward facing notch 110 that engages a rod 112 extending between side members 40a. At the rear of the body 12a, a pair of U-shaped cleats 114 are welded to the underside of the floor 30a and are engaged by respective ones of a pair of hooks 116. The hooks 116 are secured to a rod 118 that extends between the side frames 40a and is cranked at one end to provide a handle 120.

In normal use, the body 12a is secured on the chassis 14a by the notch 110 and the hooks 116 engaging the cleats 114. The hooks have a decreasing radius so as to pull down on the cleats as the rod 118 is rotated by the handle 120. When access to the batteries or control is required, the rod 18 is rotated to release the hooks from the cleats and the body 12a can pivot about the 112 to the position shown in FIG. 4. The provision of the notches 110 also allows the body 12a to be removed entirely from the chassis 12a, and so enables different configurations of the body 12a to be exchanged quickly and simply without the need for additional tools or specialised fitting. In this way, the body 12a may easily be changed for a platform or larger capacity body where conditions require.

It will also be noted from FIG. 12 that the handles 22a are modified at their attachment to the side frames 40a to have a quadrant cross section. A pair of flats 120 are formed on two adjacent sides to provide a greater bearing area between the handles and side frame.

Figure 13:
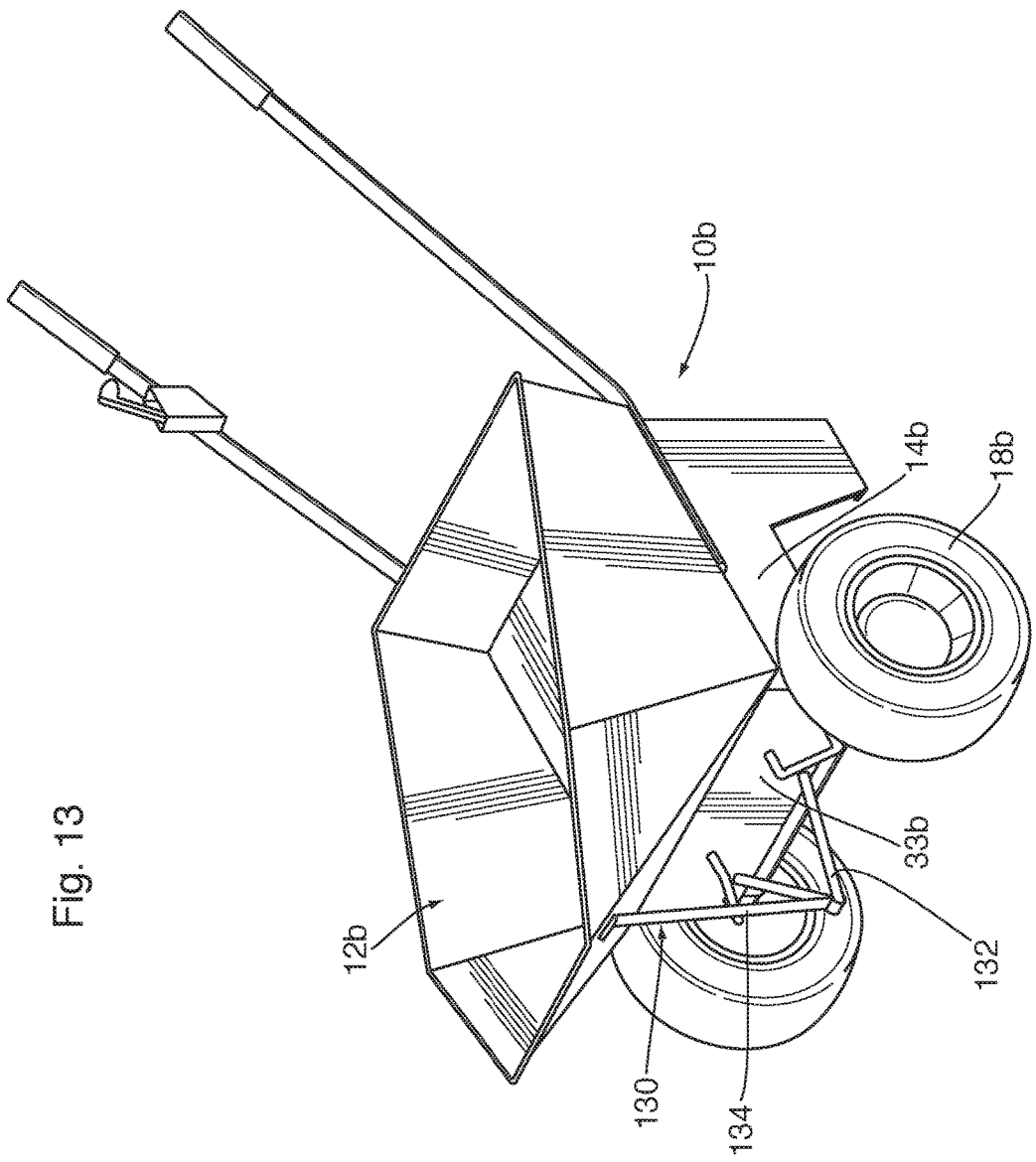
FIG. 13 is a view similar to FIG. 2 of a further adaptation of the wheelbarrow of FIG. 1.

A further adaptation of the wheelbarrow is shown in FIG. 13 with like reference numerals identifying like components with a suffix "b" added for clarity. In the arrangement of FIG. 13, a prow 130 is secured to the forward cross member to facilitate tipping and manoeuvering of the barrow 10b. The prow 130 has a pair of struts 132 secured to the front cross member 46a at spaced locations. The struts 132 project forwardly to meet on the centreline of the wheelbarrow 12b and forward of the wheels 18b. A brace 134 extends upwardly from the struts 132 to the front portion 33b. In use, the prow 130 engages the ground as the wheelbarrow 10b is tipped and permits the wheels 18b to be lifted from the ground. The prow provides a central pivot point that allows the wheelbarrow 10b to be "shaken to release the contents of the body 12b. The prow may of course be made removable but it will be appreciated that the chassis 14b provides a secure attachment for the prow with sufficient inherent rigidity to support the load in the manner envisaged.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What is claimed is:

1. A wheelbarrow having a load carrying body supported on a chassis, an electrically powered axle assembly located at one end of the chassis and a pair of ground engaging wheels disposed at opposite sides of the axle assembly, said chassis including a pair of side plates that extend downwardly at a location spaced from said wheels to provide legs to support said body on the ground, a pair of handles secured to said side plates, one on each side of the body, to transfer vertical loads from the handles in to the chassis and thereby elevate said legs and facilitate movement of said wheels across the ground, a cross member extending between the side plates to maintain them in spaced relationship, and a shelf extending between the side plates and spaced below the underside of the body to provide a cavity to receive a battery.

2. The wheelbarrow of claim 1 wherein said legs and said handles are located rearwardly of said wheels.

3. The wheelbarrow of claim 2 wherein said handles diverge rearwardly from said body.

4. The wheelbarrow of claim 2 wherein said handles are connected to a lug projecting from said side plates.

5. The wheelbarrow of claim 4 wherein said body is secured to the handles and side plates by a bolt passing through said lugs.

6. The wheelbarrow of claim 2 wherein a directional switch is carried on one of the handles so as to be accessible to the operator while lifting the load.

7. The wheelbarrow of claim 6 wherein the switch can be moved to either side of a null position for movement in opposite directions.

8. The wheelbarrow of claim 7 wherein said switch includes a paddle overlying said one handle for engagement by an operator.

9. The wheelbarrow of claim 8 wherein said switch provides an output from said axle assembly that is proportional to the displacement from the null position.

10. The wheelbarrow of claim 9 wherein said switch is located in a socket secured to said one handle.

11. The wheelbarrow of claim 10 wherein control wires from said switch are routed within said one handle.

12. The wheelbarrow of claim 1 wherein control circuitry for the axle is mounted on a side plate above the shelf and said control wires are connected to said control circuitry.

13. The wheelbarrow of claim 1 wherein said side plates and cross member have an inwardly directed flange along an upper edge and said body is supported on said flange.

14. The wheelbarrow of claim 13 wherein said chassis has a front cross member and a rear cross member, said rear cross member having legs depending from the cross member and connected to legs on respective ones of said side plates.

15. The wheelbarrow of claim 14 wherein said axle assembly is located adjacent said forward cross member.

16. The wheelbarrow of claim 15 wherein said shelf extends to said forward cross member and an opening is provided in said shelf to accommodate said axle assembly.

17. The wheelbarrow of claim 1 wherein a pivotal connection is provided between said body and said chassis for pivotal movement of said body on said chassis at its forward end to permit access to the cavity.

18. The wheelbarrow of claim 17 wherein a releasable latch is provided to retain said body on said chassis.

19. The wheelbarrow of claim 18 wherein said pivotal connection includes a pivot pin on one of said chassis and body and a plate having a notch on the other of said chassis and said body, said notches engaging said pivot pins and allowing removal of said body upon release of said latch.

20. The wheelbarrow of claim 19 wherein said notches face forward.

* * * * *